A. & W. T. JOHNSTON.
Ruffling Attachment for Sewing-Machines.
No. 5,072. Reissued Sep. 24, 1872.
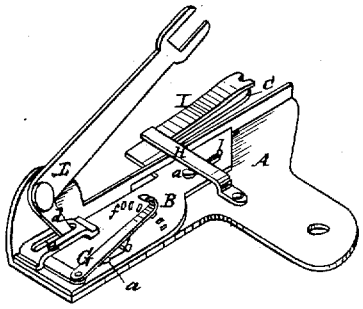
Witnesses.
C. B. Nottingham
A. Moore
Inventors.
Allen Johnston &
Wm. T. Johnston by
A. Wollok
atty.
THE NORRIS PETERS CO., PHOTO-LITHO., WASHINGTON, D. C.

UNITED STATES PATENT OFFICE.

ALLEN JOHNSTON AND WILLIAM T. JOHNSTON, OF OTTUMWA, IOWA, ASSIGNORS TO THE JOHNSTON RUFFLER COMPANY, OF SAME PLACE.

IMPROVEMENT IN RUFFLING ATTACHMENTS FOR SEWING-MACHINES.

Specification forming part of Letters Patent No. 111,458, dated January 31, 1871; reissue No. 5,072, dated September 24, 1872.

*To all whom it may concern:*

Be it known that we, ALLEN JOHNSTON and WILLIAM T. JOHNSTON, of Ottumwa, Wapello county, Iowa, have invented certain new and useful Improvements in Gathering and Ruffling Attachments for Sewing-Machines, of which the following is a specification:

Our invention relates, principally, to that class of gathering and ruffling attachments in which a reciprocating gatherer proper is actuated from or by the needle-bar or arm of the sewing-machine through the intermediary of a vibratory lever, and in many respects it may be considered as an improvement upon the attachment shown and described in Letters Patent to Allen Johnston, No. 108,486, of October 18, 1870.

The principal features of our invention relate: First, to actuating the reciprocating gatherer proper. Second, to the formation of the gatherer proper or device by which the material is gathered into folds, which are successively presented to the action of the needle. Third, to the means for adjusting the length of the reciprocatory movement of the gatherer proper for the purpose of regulating the fullness of the gathers.

First, in all gatherers and rufflers containing the combination of a sliding reciprocatory gatherer proper, and a vibratory lever—usually an angle or bell-crank lever—for operating the same, the gatherer proper has heretofore invariably received a positive movement in one direction only—that is to say, the lever has been arranged to be struck by the descending needle-arm or bar, and to so impart a positive motion to the gatherer in the direction toward which the lever arm of the lever vibrates when thus positively actuated. But the action of the needle-bar or arm on the lever has heretofore ceased with the completion of its downward movement, and the reverse movement of the lever, needed in order to bring it again into position to be struck by the needle-bar and also to draw the gatherer in a direction opposite to that in which it moved during the descent of the needle, has always been effected by means of the recoil of a spring compressed during the preceding movement of the gatherer. We have found this use of the spring objectionable. It detracts from the simplicity of the attachment, and the action of the spring is not uniform, but will vary according to the conditions of use and the nature of the goods operated on. More power is required to operate upon thick goods than upon goods comparatively thin. If the reciprocating gatherer or the lever should happen to be clogged in any way the spring will not act with sufficient readiness to bring the parts back into position, and then, with continued use, the elasticity of the spring is apt to be impaired, and in any one of these contingencies the gatherer will not do its work perfectly and satisfactorily.

Our invention is in part designed to obviate this defect; and to this end it consists of a gathering and ruffling attachment for sewing-machines, in which the sliding reciprocatory gatherer proper receives a positive back-and-forth movement from the needle-arm or bar through the intermediary of a vibratory lever of which one arm is connected with the reciprocating gatherer, and the other arm is formed and arranged to connect with and receive a positive motion in both directions from said needle-arm or bar, substantially as hereinafter described. By this means we dispense entirely with a spring, and the gatherer is positively compelled to move in both directions, thus avoiding all contingency of any uncertainty and inequality in its reciprocations.

With the lever and gatherer thus arranged and actuated we combine means whereby, without interfering with the necesssary connection of the lever with the needle-bar or arm, the length of movement of the gatherer may be adjusted to regulate the fullness of the gathers.

Secondly, we have found it advisable, in order to maintain the gather in condition to be properly presented to the action of the needle, to provide means, in connection with the reciprocating gathering blade or plate, whereby the gather formed by said blade during its forward movement may be prevented from being drawn back when the blade is receding in order to take a fresh hold on the goods preparatory to making another gather. To this end we combine with the reciprocating gathering blade or plate a stationary blade or plate placed above the same, and between which and the reciprocating plate passes the material to be operated on, the two being so arranged that the stationary blade will hold the gather and prevent it from slipping back while the gathering-blade is receding preparatory to taking a fresh hold on the goods, substantially as hereinafter described.

Thirdly, our improvement in the devices for adjusting the length of movement of the gathering-plate applies to a gathering and ruffling attachment, such as shown and described in the patent of Allen Johnston, hereinbefore named, in which the reciprocating gatherer is combined with a vibratory actuating lever, one arm of which plays loosely in a slot or recess in the gathering-plate so as to have a certain amount of lost motion therein, which may be lessened or increased in order to bring the lever-arm sooner or later in contact with the ends of the recess or slot, and thus determine the length of movement of the gathering-blade. Our improvement consists in the employment, for the purpose of effecting this adjustment, of an adjusting-lever, pivoted to the gathering-plate, and having one of its arms extending across the slot or recess, and so arranged that when the adjusting-lever is moved its said arm will increase or decrease the length of the space in which the actuating-lever is capable of moving without imparting its motion to the gathering-plate.

In the accompanying drawing we have represented, in illustration of the manner in which our invention is or may be carried into effect, a perspective view of a gathering and ruffling attachment containing the several improvements above named.

The devices composing the attachment are carried by a suitable frame, A, which is here adapted to be secured to the cloth-plate of a sewing-machine. The gatherer proper is secured on the frame in such manner as to be capable of a sliding movement toward and away from the needle of the sewing-machine. It consists of a carrier, B, to which is attached the gathering blade or plate C, and is held to the bed plate or frame A by means of headed rivets or screws *a*, extending down into the frame through longitudinal slots *b* in the carrier. The reciprocating movement of the gatherer is obtained from the vibratory angle-lever D, pivoted to a suitable standard on frame A. The shorter arm *d* of this lever extends into a slot or recess, *e*, with which the plate B is provided; and it is, as shown, capable of considerable movement without coming in contact with the ends of the slot or recess, and thus pushing the gatherer in one direction or the other, as the case may be. This lost motion of the lever-arm *d* can be increased or decreased at pleasure, as hereinafter described. The longer arm of the lever D is designed to be so attached to and connected with the needle bar or arm that it will thereby be compelled to follow the latter in its up-and-down movement, and thus impart a positive motion in both directions to the gatherer. To this end the said lever is here represented with a forked end, designed to embrace the needle-screw on the needle-bar, so that it will be carried up and down with the motion of said bar; and the lever is so located and arranged that when the attachment is secured in place on the machine its forked end will come in proper position to enable the specified connection between it and the needle-bar to be made. We thus obtain a positive motion for the gatherer in both directions, and, the adjustment of the length of gather once made, the gathering-blade will move uniformly, accurately, and with an unvarying length of reciprocation.

To regulate the length of movement of the gatherer we here employ an adjusting-lever, G, pivoted to the reciprocating plate B, and having one of its arms extending across the slot or recess *e* at or near one end thereof, as shown. By moving the lever on its pivot the arm thus extending across the slot or recess *e* at or near one of its ends will be caused to advance toward or recede from the opposite end of said slot or recess, and will thus decrease or increase the space in which the lever-arm *d* can move without actuating the plate B. The adjustment of lever G is effected by means of its longer arm, which may be held at any point desired by means of a small projection on its under side taking into one of the notches *f* formed in the upper face of plate B.

In order to hold the gatherer and prevent it from slipping back when the gathering-blade recedes for the purpose of taking a fresh hold on the goods, we employ a stationary plate or blade, shown at I, which is arranged above or over the gathering-blade C. The front end of this stationary blade, like the front end of the gathering-blade, is slotted to permit the passage of the needle in sewing the gathers. The material to be ruffled or gathered passes between these two blades, and they are so arranged and formed that their outer or front ends converge, the end of the lower blade pressing against the under side of the stationary blade when the attachment is applied to the machine ready for use, in which position the end of the stationary blade should bear upon the cloth-plate or other part through which the needle descends below said plate. In consequence of this arrangement the under blade is enabled to take hold of and push forward the material in order to make the gather, which is then held or nipped between the edge of the stationary blade and the cloth-plate, so as to be effectually prevented from slipping back, when the under gathering recedes to take a fresh hold on the goods.

The blade I, as indicated in the drawing, may be composed of a strip of spring-metal like the lower blade C; and in the device represented the downward bearing of this stationary spring-plate upon the cloth-plate is obtained by making it of such length as to extend under and receive downward pressure from the spring presser-foot or bar of the machine. In order to enable the blades to perform their work with more certainty we turn the end of the upper blade slightly downward and the end of the under blade slightly upward, the former for the purpose of causing the stationary blade to more surely maintain its hold on the gather, and the latter in order to enable the gathering-blade to better take hold of and push forward the goods in forming the gather. The plate I is secured to the frame of the attachment or to an arm, H, formed on or attached to the same.

Having now described one manner in which our said improvements may be carried into effect, what we claim herein as new, and desire to secure by Letters Patent, is—

1. In a gathering and ruffling-attachment for sewing-machines, the combination with a reciprocating gatherer proper, and a supporting-frame upon which said gatherer is held and slides, of a vibratory lever, of which one arm is connected with the said gatherer and the other arm is formed and arranged to connect with and receive a positive motion in both directions from the needle-bar or arm of the sewing-machine, so as to impart a positive back-and-forth movement to said gatherer, substantially as shown and set forth.

2. The combination, in a gathering and ruffling-attachment for sewing-machines, of an upper stationary blade or plate and an under reciprocatory gathering-blade or plate, between which passes the material to be gathered, the two being arranged and operating substantially as described, so that the stationary blade will hold the gather and prevent it from sliding back while the gathering-blade is receding preparatory to taking a fresh hold on the goods.

3. The reciprocating spring gathering-blade having its front end slotted and turned upward, in combination with the stationary spring-blade placed above the gathering-blade, and having its front end slotted and turned downward, substantially as and for the purposes shown and described.

4. In combination with the reciprocating gatherer, and the lever for actuating the same, the adjusting-lever or arm extending across the slot or recess in the gatherer in which the actuating-lever works, and arranged and operated to increase or lessen, at pleasure, the lost motion of said lever in said recess or slot, substantially as herein shown and described.

In testimony whereof we have signed our names to this specification before two subscribing witnesses.

ALLEN JOHNSTON.
WILLIAM T. JOHNSTON.

Witnesses:
J. S. PAINTER,
THOMAS K. SHEPHERD.